United States Patent
Cheung et al.

(10) Patent No.: US 9,049,126 B2
(45) Date of Patent: *Jun. 2, 2015

(54) TRANSACTION MIDDLEWARE BASED APPLICATION LEVEL TRANSACTION INSTANCE TRACKING ACROSS A COMPOSITE APPLICATION

(71) Applicant: INTERNATIONAL BUSINESS MACHINES CORPORATION, Armonk, NY (US)

(72) Inventors: Robert C. K. Cheung, South Perth (AU); Scot Dixon, South Perth (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 171 days.

This patent is subject to a terminal disclaimer.

(21) Appl. No.: 13/738,183

(22) Filed: Jan. 10, 2013

(65) Prior Publication Data

US 2014/0108646 A1    Apr. 17, 2014

Related U.S. Application Data

(63) Continuation of application No. 13/651,956, filed on Oct. 15, 2012.

(51) Int. Cl.
*H04L 12/26* (2006.01)
*G06F 9/44* (2006.01)

(52) U.S. Cl.
CPC . *H04L 43/10* (2013.01); *G06F 8/00* (2013.01)

(58) Field of Classification Search
CPC ............ H04L 43/00; G06F 8/00; G06F 15/00

USPC .................................................. 709/224–225
See application file for complete search history.

(56) References Cited

U.S. PATENT DOCUMENTS 5,970,064 A * 10/1999 Clark et al. .................... 370/351
6,832,238 B1   12/2004 Sharma et al.
(Continued)

OTHER PUBLICATIONS

Darmawan, Budi, et al., IBM Tivoli Composite Application Manager Family: Installation, Configuration, and Basic Usage, International Business Machines Corporation, available online from www.ibm.com/redbooks, Jan. 2008, 688 pages.
(Continued)

*Primary Examiner* — Ebrahim Golabbakhsh
(74) *Attorney, Agent, or Firm* — Jeffrey S. Labaw; Amy J. Pattillo

(57) ABSTRACT

Responsive to transactional middleware for a particular domain processing a particular transaction instance at a processing point specified in transaction telemetry standards as a tracking point along a flow of the particular transaction, a facility of the middleware accesses correlation data for the particular transaction instance in the particular domain and extracts application level context information about the particular transaction instance from the particular domain, wherein the transaction telemetry standards specify a same set of standards for application by each separate transactional middleware instance of a composite application. At least one facility of the transactional middleware creates a tracking event comprising the correlation data and the application level context information formatted into an event structure defined by the transaction tracking standards. At least one facility of the transactional middleware surfaces the tracking event in compliance with the transaction telemetry standards.

10 Claims, 9 Drawing Sheets

(56) References Cited

U.S. PATENT DOCUMENTS

| | | | |
|---|---|---|---|
| 7,668,093 B1* | 2/2010 | Clubb et al. | 370/231 |
| 8,027,922 B2 | 9/2011 | Lee | |
| 2005/0157660 A1* | 7/2005 | Mandato et al. | 370/254 |
| 2006/0013230 A1* | 1/2006 | Bosloy et al. | 370/395.42 |
| 2007/0240167 A1 | 10/2007 | Gurumoorthy et al. | |
| 2012/0089963 A1 | 4/2012 | Claussen et al. | |
| 2012/0167072 A1 | 6/2012 | Boykin et al. | |
| 2014/0108641 A1 | 4/2014 | In re Cheung | |

OTHER PUBLICATIONS

Darmawan, Budi, et al., "Large-Scale Implementation of IBM Tivoli Composite Application Manager for WebSphere and Response Time Tracking", International Business Machines Corporation, available online from www.ibm.com/ redbooks, Dec. 2007, 172 pages.

"ITCAM for Transactions v7.3 Customization: Transaction Tracking Filtering and Reporting", International Business Machines Corporation, 2011, 18 pages.

Dixon, Scot, et al, "ITCAM for Transactions on z/Series" International Business Machines Corporation, 2011, 25 pages.

Cheung, Robert, "Transaction Tracking: Best Practice for Expanding End-to-End Coverage", International Business Machines Corporation, 2012, 12 pages.

U.S. Appl. No. 13/651,956, filed Oct. 15, 2012, in re Cheung, 54 pages.

Non-final Office Action, mailing date Aug. 29, 2014, U.S. Appl. No. 13/651,956, filed Oct. 15, 2012, In re Cheung, 21 pages.

Notice of Allowance, mailing date Dec. 23, 2014, U.S. Appl. No. 13/651,956, filed Oct. 15, 2012, In re Cheung, 18 pages.

* cited by examiner

TRANSACTION MIDDLEWARE BASED APPLICATION LEVEL TRANSACTION INSTANCE TRACKING ACROSS A COMPOSITE APPLICATION

CROSS REFERENCE TO RELATED APPLICATIONS

This application is a continuation of commonly assigned U.S. patent application Ser. No. 13/651,956, filed Oct. 15, 2012, which is hereby incorporated herein by reference.

TECHNICAL FIELD

The embodiment of the invention relates generally to monitoring transactions across a composite application in a distributed environment and particularly to transaction middleware based application level transaction instance tracking across a composite application.

DESCRIPTION OF THE RELATED ART

Many businesses provide online services that require the business to process multiple concurrent requests, complex requests, or both, in an efficient manner. Online businesses may submit requests to a business application that is tailored to handle each request as one or more transactions that run on the business application to perform a function, such as data research or a purchase. In one example, a composite application represents the multiple distributed components of a business application that run on different middleware stacks distributed across one or more operating system platforms and one or more servers in a distributed environment, to efficiently handle purchase requests, data requests, or other requests. Servers, operating system platforms, middleware stacks, and other components of a distributed environment may include tracking services that are installed, external to the middleware stacks, to track a transaction across a composite application distributed across multiple technologies, protocols, domains and operating systems.

BRIEF SUMMARY

Application Level Transaction Instance (ALTI) tracking services that track composite applications across multiple technologies, protocols, domains, and operating systems, at an application level, impact the distributed environment. In view of the foregoing, there is a need for a method, system, and computer program product for implementing ALTI tracking services through standardized tracking telemetry in transactional middleware to provide application level transaction instance tracking across a composite application. In particular, there is a need for a method, system, and computer program product for providing ALTI tracking services through transactional middleware based transaction instance tracking that is also is reliable, available, and serviceable, with minimal impact to the performance of the distributed environment.

In one embodiment, a method for tracking a transaction flow in a distributed environment comprising at least one computer system is directed to responsive to transactional middleware for a particular domain processing a particular transaction instance at a particular processing point specified in transaction telemetry standards as a tracking point along a flow of the particular transaction, accessing, by at least one facility of the transactional middleware, correlation data for the particular transaction instance in the particular domain and extracting, by the at least one facility, application level context information about the particular transaction instance from the particular domain, wherein the transaction telemetry standards specify a same set of standards for application by each separate transactional middleware instance of multiple middleware instances of a composite application through each of the different types of facilities of each separate middleware instance. The method is directed to creating, by the at least one facility of the transactional middleware, a tracking event comprising the correlation data and the application level context information formatted into an event structure defined by the transaction tracking standards for a type of processing point of the tracking point. The method is directed to surfacing the tracking event, by the at least one facility of the transactional middleware in compliance with the transaction telemetry standards, for access to the tracking event by applications external to the particular domain.

BRIEF DESCRIPTION OF THE SEVERAL VIEWS OF THE DRAWINGS

The novel features believed characteristic of one or more embodiments of the invention are set forth in the appended claims. The one or more embodiments of the invention itself however, will best be understood by reference to the following detailed description of an illustrative embodiment when read in conjunction with the accompanying drawings, wherein:

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In addition, in the following description, for purposes of explanation, numerous systems are described. It is important to note, and it will be apparent to one skilled in the art, that the present invention may execute in a variety of systems, including a variety of computer systems and electronic devices operating any number of different types of operating systems.

Figure 1:
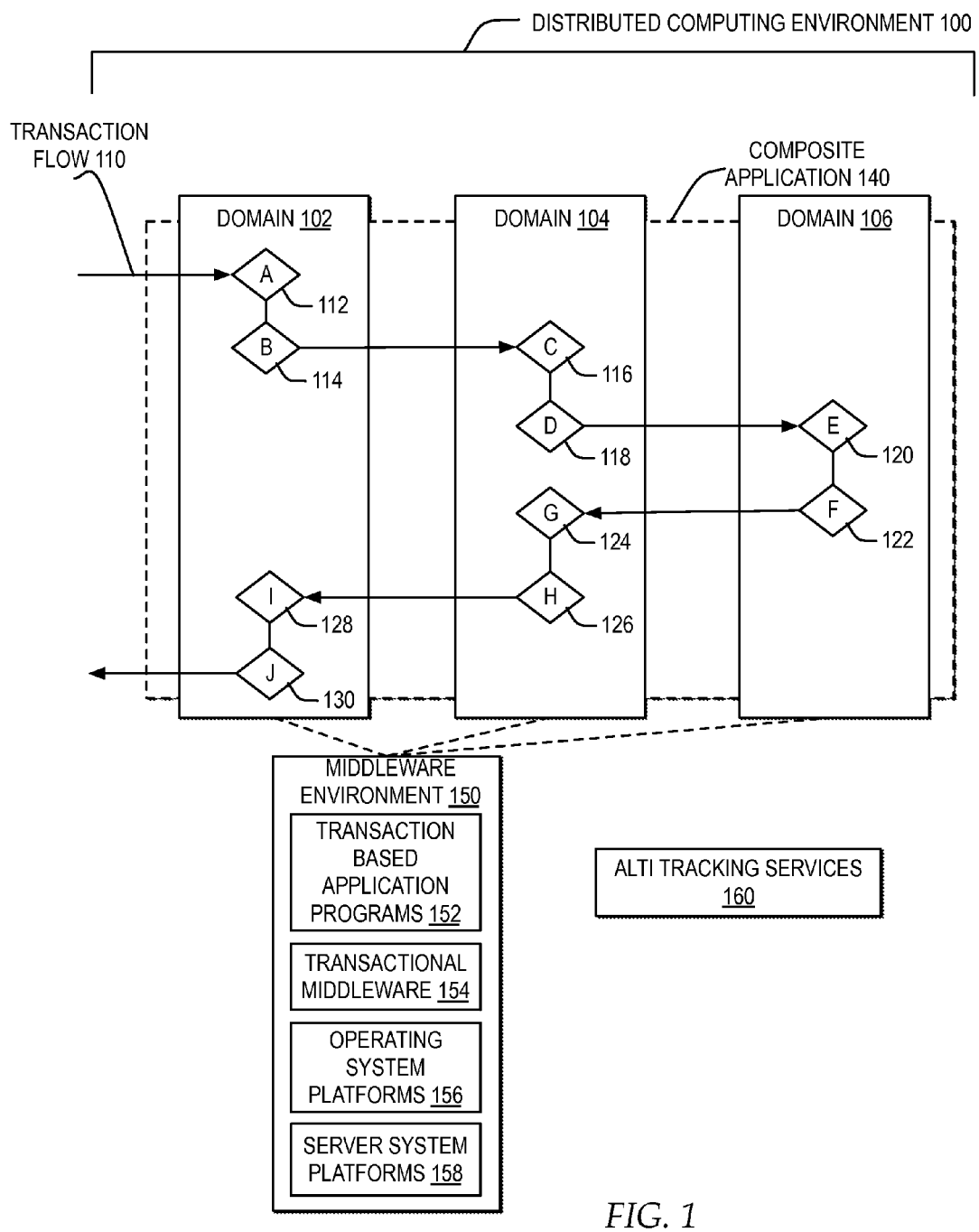
FIG. 1 illustrates a block diagram of an application level transaction flow through a composite application in a distributed computing environment.

FIG. 1 illustrates a block diagram of an application level transaction flow through a composite application in a distributed computing environment.

In one example, a distributed computing environment 100 includes one or more distributed hardware resources, one or more distributed software resources, and one or more distributed network resources. In one example, distributed computing environment 100 may include domains, illustrated as domain 102, domain 104, and domain 106. In the example, each of the domains illustrated within distributed computing environment 100 implements a separate instance of a middleware environment. In one example, a middleware environment includes one or more of the layers illustrated in middleware environment 150. Middleware environment 150 includes one or more types of transaction based application programs 152 and transactional middleware 154 distributed across one or more server system platforms 158 and across one or more operating system platforms 156. In one example, transactional middleware 154 represents software stacks that provide a multiprocessing client/server environment that runs in a layer above the operation system platforms 156 layer and supports transaction based application programs 152. For example, transactional middleware 154 may include, but is not limited to, application servers, such as an Hypertext Transfer Protocol (HTTP) web server for delivering web pages requested by clients using HTTP, a WebSphere® Application Server (WAS), a software application server, a Customer Information Control System (CICS), a transaction server that runs on a mainframe system to rapid, high-volume online processing, an Information Management System (IMS), a joint hierarchical database and information management system, and application service providers, such as WebSphere® MQ®, a message oriented middleware, and a relational database, such as DB2®, enabled as a web service. In one example, domain 102 may implement a middleware environment of a distributed WAS with an IMS interface, domain 104 may implement a middleware environment of a gateway, such as an IMS connect gateway with an Open Transaction Manager Access (OTMA) user data area and an OTMA work area, and domain 106 may implement a middleware environment of a backend, such as a Z/OS or IMS backend with a control region. While in the example distributed computing environment 100 is illustrated as including domain 102, domain 104, and domain 106, it will be appreciated by one of skill in the art that distributed computing environment 100 may include additional or alternate domains and it will be appreciated by one of skill in the art that domains within distributed computing environment 100 may include additional or alternate layers to the layers illustrated in middleware environment 150.

In one example, one or more composite applications may run in distributed computing environment 100 on the distributed resources. In one example, composite application 140 runs in distributed computing environment 100, where composite application 140 is made up of multiple distributed components across domain 102, domain 104, and domain 106, each including a separate instance middleware environment 150. A composite application may represent a business application specified for handling one or more types of requests, where a request to the business application from a user application runs, as one or more transactions, on one or more of the multiple domains. It should be appreciated that composite application 140 may include distributed components that run on additional or alternate domains of distributed computing environment 100. In addition, it should be appreciated that distributed computing environment 100 may include additional or alternate domains or instances of domains that distributed components of composite application 140 do not run on.

In one example, a requester, or invoker, submits one or more requests to composite application 140, where each request is handled as a transaction instance that flows through the distributed components of composite application 140 and returns a result to the requester. In the example, a transaction instance may flow across multiple domains, from end to end, as illustrated by transaction flow 110. In the example, transaction flow 110 moves through domain 102, domain 104, domain 106, domain 104, and then domain 102, before returning a result. One or more clients may submit requests to composite application 140 from one or more application layers to invoke transaction instances. Although a single transaction flow 110 is illustrated, it should be appreciated that multiple clients may submit requests to composite application 140 to invoke multiple transaction flows. In addition, while in the example the requester initiates a transaction that starts transaction flow 110 at domain 102, in other embodiments, the requester may initiate a transaction that starts transaction flow 110 at other domains within composite application 140.

In one example, as a transaction instance flows across domain 102, domain 104, and domain 106 as illustrated by transaction flow 110, FIG. 1 illustrates examples of one or more process points along transaction flow 110. In the example, process points may include, but are not limited to, process points at which an incoming request has been received for a transaction in a domain from a requester of the transaction instance or from another domain and process points at which the transaction has made a request has been sent from a domain, for a service external, or downstream, to the current domain or to return a result to the requester of a transaction instance. In the example, a process point A 112, a process point C 116, a process point E 120, a process point G 124, and a process point I 128 represent process points at which an incoming request has been received by a domain for the transaction instance, along transaction flow 110, in each of domain 102, domain 104, and domain 106. In the example, a process point B 114, a process point D 118, a process point F 122, a process point H 126, and a process point J 130 represent process points at which the transaction instance, along transaction flow 110, has made a request for a service external to, or downstream from, the current domain or sent a result to a requester, for each of domain 102, domain 104, and domain 106.

In the example, within the middleware environment for each domain, the transactional middleware controls a middleware space within each middleware environment, in which first class properties of the transactional middleware are processed. In addition, within the middleware environment for each domain, the transactional middleware controls an application space within each middleware environment, in which transaction based application programs and other components external to the transactional middleware are processed, in a protected process environment that adds one or more barriers to protect the transactional middleware from the applications and external components, and which may restrict the applications and external components to access to portions of the operating system platforms and server system platforms allocated to the application space.

In the example, ALTI tracking services 160 are implemented within distributed computing environment 100 for tracking, at an application level, each transaction instance flowing through composite application 140 at one or more processing points. In one example, ALTI tracking services 160 trigger application level transaction tracking, using tracking events that contain ALTI data extracted from the middleware environment, at one or more of process point A 112, process point B 114, process point C 116, process point D 118, process point E 120, process point F 122, process point G 124, process point H 126, process point I 128, and process point J 130. In additional or alternate examples, ALTI tracking services 160 may track a transaction instance at additional or alternate process points along transaction flow 110.

In the example, ALTI tracking services 160 may be implemented through one or more types of tracking components, distributed throughout composite application 140. The tracking components generate tracking events, each containing ALTI data collected at a process point. One or more monitoring applications may collect the tracking events and analyze the ALTI data in the tracking events to determine application metrics and topology.

As will be further described with reference to FIG. 2, in one embodiment, ALTI tracking services 160 may be implemented through external component monitoring, such as by using data collector services, implemented as components external to transactional middleware 154 in a domain, that generate tracking events with ALTI data as data collectors hooked into exits of transactional middleware 154. In another example, as will be further described with reference to FIG. 3, ALTI tracking services 160 may be implemented through middleware based monitoring, referred to as ALTI visibility, comprising ALTI compliant, native, first class property facilities of transactional middleware 154 implemented in compliance with transactional telemetry standards. ALTI visibility in transactional middleware 154 defines a set of standards describing ALTI tracking events, ALTI tracking process requirements, and ALTI tracking event surfacing that are required to be implemented by one or more facilities of the transactional middleware, independent of the specific technologies, protocols, operating system layers, server system layers, facilities, and other components of the middleware environment implementing the transactional middleware. Because ALTI visibility defines a same set of standards for application by any transactional middleware across multiple domains, even though each middleware environment may vary, the tracking events output by each transaction middleware instance implementing ALTI visibility will provide ALTI data output in a same data structure, collected for the same types of events, and surfaced according to the same standards.

Figure 2:
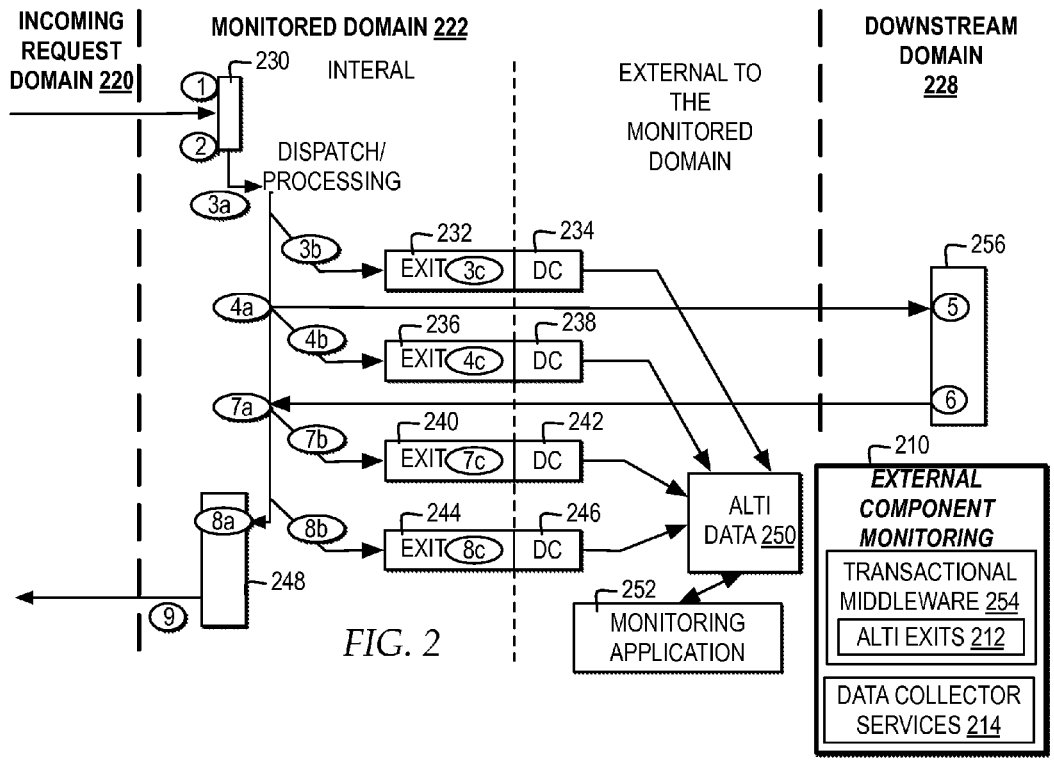
FIG. 2 illustrates a block diagram illustrating one example of ALTI tracking services implemented through external component monitoring performed by components implemented external to the transactional middleware of a domain.
Figure 3:
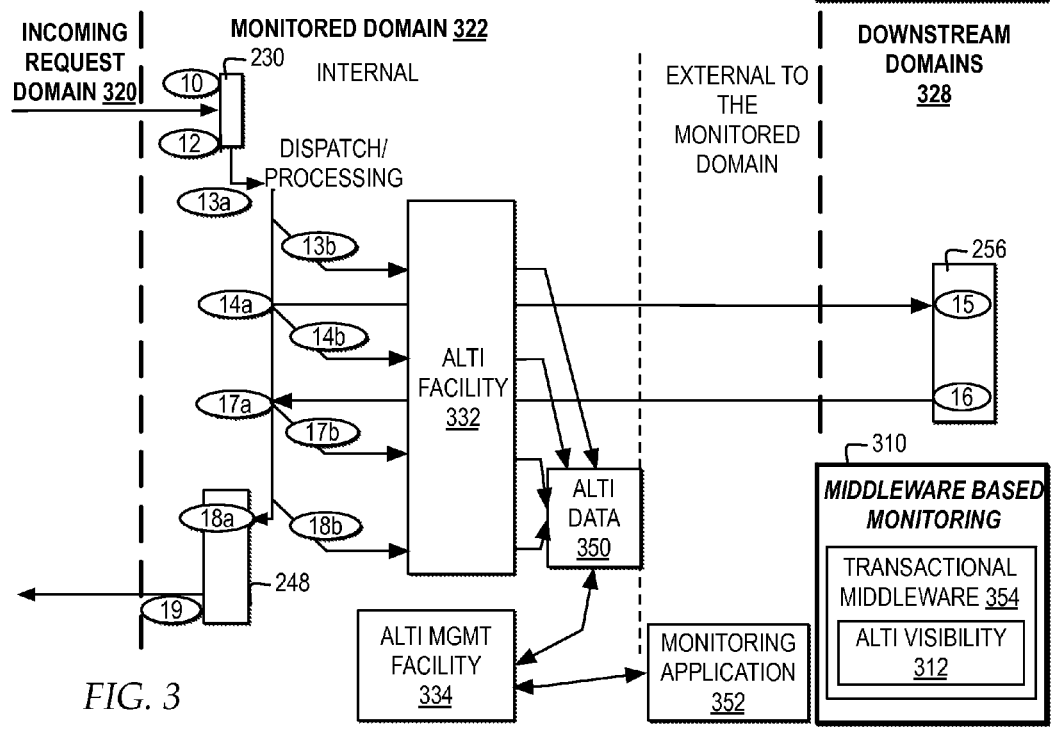
FIG. 3 illustrates a block diagram illustrating one example of ALTI tracking services implemented by transactional middleware, referred to as ALTI visibility.

As will be further described, while the use of external component monitoring illustrated in FIG. 2, through exits specified in transactional middleware 154 and data collector services external to transactional middleware 154 provides one method of extracting ALTI data and generating tracking events for ALTI tracking services 160, installation of data collectors as hooks as external components of transactional middleware 154 and the use of exits within transactional middleware 154 also introduces performance issues through increased CPU overhead in critical application paths within transactional middleware 154, increased risk of causing application failure within transactional middleware 154, and increased complexity for installation, configuration, and maintenance of the data collectors. As will be further described, the use of middleware based monitoring illustrated in FIG. 3 provides another method of extracting ALTI data and generating tracking events for ALTI tracking services 160, and the middleware based monitoring of FIG. 3, in contrast to external component monitoring described in FIG. 2, is implemented without increasing CPU overhead in critical application paths within transactional middleware 154, with minimal risk of causing application failure within transactional middleware 154, without requiring any installation or maintenance of any components external to transactional middleware 154, and with simplified configuration requirements. FIG. 3 provides ALTI tracking services 160 through standardized transaction tracking telemetry in transactional middleware to provide ALTI tracking services 160 without the performance, reliability, availability, serviceability, and installation impact associated with external component monitoring in FIG. 2.

FIG. 2 illustrates a block diagram illustrating one example of ALTI tracking services implemented through external component monitoring performed by components implemented external to the transactional middleware of a domain. In the example, ALTI tracking services 160 may be implemented within one or more of domain 102, domain 104, and domain 106 through external component monitoring 210 by programming ALTI exits 212 in transactional middleware 254, implemented in a monitored domain 222, and by installing, configuring, and maintaining data collector services 214 as functions in a space external to monitored domain 222. In the example, monitored domain 222 implements, internally, transactional middleware 254, including ALTI exits 212 implemented as exit 232, exit 236, exit 240, and exit 244. In the example, data collector services 214 are installed, configured, maintained, and implemented external to monitored domain 222, illustrated as data collector (DC) 234, DC 238, DC 242, and DC 246, where DC 234 is configured to read exit 232, DC 238 is configured to read exit 236, DC 242 is configured to read exit 240, and DC 246 is configured to read exit 244. In the example, a component is described as external to monitored domain 222 when the component is not a native, first class property of transactional middleware 254 or when the component is required to be hooked into transactional middleware 254. In one example, exit 232, exit 236, exit 240, and exit 244 each represent one or more types of exits, callbacks, hooks, extensions, plug-ins, class libraries, or other facilities programmed into transactional middleware 254 to allow for functionality extensions to be hooked into transactional middleware 254, such the functionality extensions of DC 234, DC 238, DC 242, and DC 246 hooked into transactional middleware 254.

In the example, for ALTI tracking services 160 implemented through external component monitoring 210, each of exit 232, exit 236, exit 240, and exit 244 are employed as specific, non-customizable, fixed points in the workflow of each transaction instance, illustrated as points 3*c*, 4*c*, 7*c*, and 8*c*. In particular, in one example of a workflow of a transaction instance, an incoming request is handled at an entry interface 230, as illustrated by points 1 and 2 and dispatched for processing, as illustrated at points 3*a*, 3*b*, and 3*c* of the workflow, where exit 232 is triggered at point 3*c*. The workflow continues with a request to downstream domain 228 at point 4*a*, and a workflow that continues at points 4*b* and 4*c*, where exit 236 is triggered at point 4*c*. The workflow continues through one or more interfaces 256 of downstream domain 228, at points 5 and 6, and an incoming request returns from downstream domain 228 to monitored domain 222, at point 7*a*. The workflow continues with processing the incoming request at 7*a*, at points 7*b* and 7*c*, where exit 240 is triggered at point 7*c*. The workflow continues with sending a result to incoming request domain 220 at outgoing interface 248, at points 8*a* and 9, and the workflow continues with points 8*b* and 8*c*, where exit 244 is triggered at point 8*c*.

In the example, each of DC 234, DC 238, DC 242, and DC 246 are not a native components of transactional middleware 254 of monitored domain 222, therefore each of DC 234, DC 238, DC 242, and DC 246 use the facilities of monitored domain 222 to extract ALTI related information, such as information related to each of the components within the middleware environment of monitored domain 222, through each of exit 232, exit 236, exit 240, and exit 244. DC 234, DC 238, DC 242, and DC 246 generate ALTI formatted data according to ALTI formatting standards for ALTI tracking services 160, from the extracted ALTI related information, expose the ALTI data in tracking events, as illustrated by ALTI data 250, and forward the tracking events, including ALTI data 250, to one or more monitoring applications, such as monitoring application 252, external to monitored domain 222, for analysis.

In the example, one effect of implementing ALTI tracking services 160 through external component monitoring 210 is that the CPU overhead for external component monitoring 210 can be high because data collectors 214 are automatically invoked by ALTI exits 212 at multiple process points specified along the transaction processing path, and for each tracking event at each data collector ALTI data is collected and exposed by the data collector, requiring a significant amount of processing for tracking transaction instances. In the example, another effect of implementing ALTI tracking services 160 through external component monitoring 210 is that requests from DC 234, DC 238, DC 242, and DC 246 are processed within an application mode or protected process environment of transactional middleware 254, not as first class properties of transactional middleware, which means that DC 234, DC 238, DC 242, and DC 246 are not able to see the full middleware environment for monitored domain 222 and are limited to processing on the processors allocated to the protected process environment. An effect of DC 234, DC 238, DC 242, and DC 246 not being able to see the full middleware environment for monitored domain 222 and being limited to the protected process environment is that the data collectors must go through one or more protective barriers and interfaces, which are often slow, to access all the ALTI related information for the middleware environment of monitored domain 222, and going through the protective barriers and interfaces requires additional CPU overhead. An additional effect of requests from DC 234, DC 238, DC 242, and DC 246 being processed in the application space is that the transaction tracking CPU overhead for the data collectors is driven into the same path as the applications processing the transaction instance, and the applications processing the transaction instance must share processing space with the transaction tracking processes. Driving the transaction tracking CPU overhead and latency into the critical path of the applications processing the transaction instance also means that any faults or errors in the transaction tracking will directly effect the applications processing the transaction instance, increasing the risk of application failure.

Figure 4:
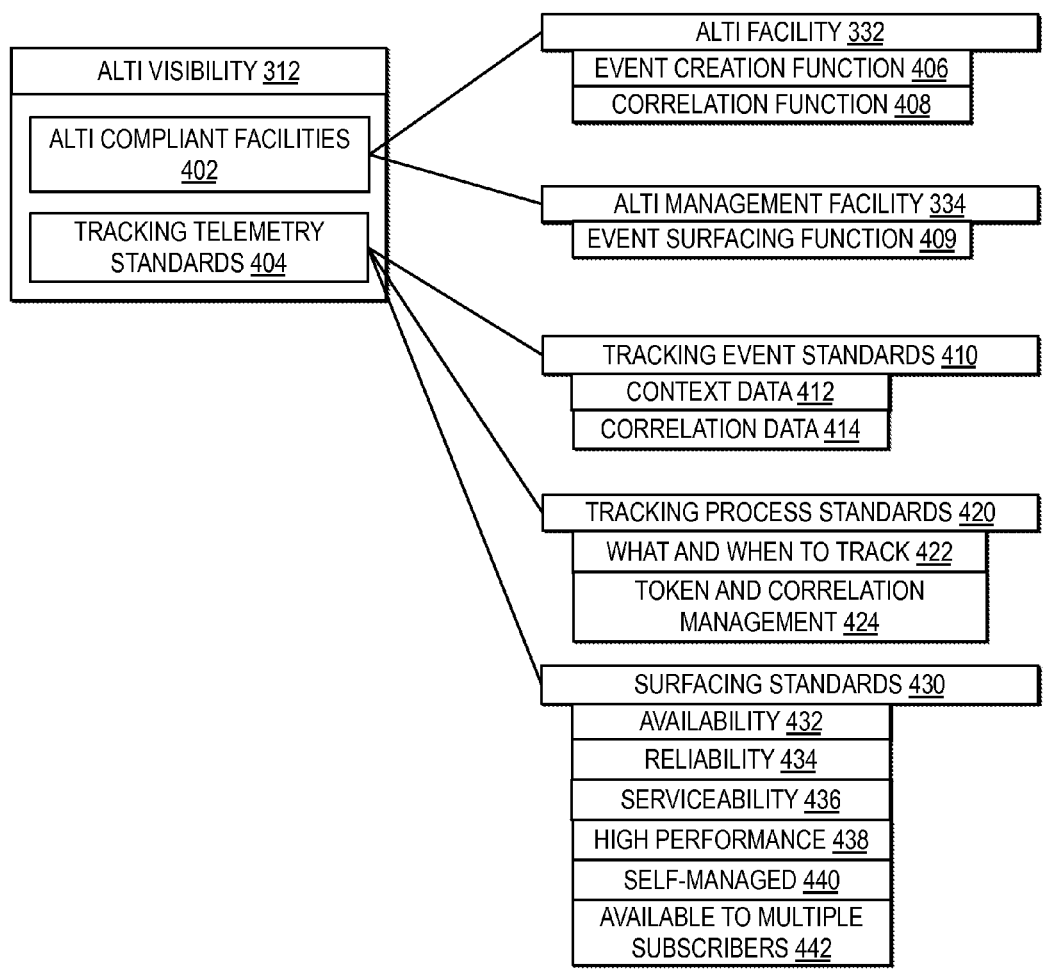
FIG. 4 illustrates a block diagram of examples of components of ALTI visibility implemented within transactional middleware for implementing standardized ALTI tracking services across composite applications.

FIG. 3 illustrates a block diagram illustrating one example of ALTI tracking services implemented by transactional middleware, referred to as ALTI visibility. In the example, ALTI tracking services 160 may be implemented as middleware based monitoring 310 through ALTI visibility 312 implemented by transactional middleware 354, implemented within a monitored domain 322. In the example, ALTI visibility 312 is implemented within monitored domain 322 through ALTI facilities, such as an ALTI facility 332 and an ALTI management (MGMT) facility 334, and according to ALTI tracking telemetry standards. As illustrated in FIG. 4, ALTI tracking telemetry standards 404 include a set of standards for ALTI tracking events, ALTI tracking process requirements, including when and what to track and token and correlation management, and ALTI tracking event surfacing.

In the example illustrated, ALTI visibility 312 is implemented through functions of transaction middleware 354. ALTI visibility 312 is a native, first class property of transactional middleware 354. By implementing standardized transaction tracking telemetry for ALTI tracking services 160, through ALTI visibility 312, as a function, and first class property, of transactional middleware 354, ALTI visibility 312 provides a low impact, highly reliable, highly available, and easily serviceable function for tracking composite application 140.

In the example, in FIG. 3, the workflow of a transaction instance includes workflow points 10, 12, 13*a*, 13*b*, 14*a*, 14*b*, 15, 16, 17*a*, 17*b*, 18*a*, 18*b*, and 19, which are similar to the workflow points 1, 2, 3*a*, 3*b*, 4*a*, 4*b*, 5, 6, 7*a*, 7*b*, 8*a*, 8*b*, and 9, illustrated in FIG. 2. The workflow of the transaction instance illustrated in FIG. 3 does not include any points corresponding to process points 3*c*, 4*c*, 7*c*, or 8*c* illustrated in FIG. 2. By implementing ALTI visibility 312 as a first class property of transactional middleware 354 as illustrated in FIG. 3, in contrast to FIG. 2, to generate tracking events, ALTI visibility 312 does not require any points in the workflow at which an exit is programmed to be triggered, or require any exits to be programmed as hooks into transactional middleware 354.

In the example in FIG. 3, ALTI facility 332 automatically generates ALTI formatted data for tracking events triggered based on the ALTI tracking telemetry standards in ALTI visibility 312. By implementing ALTI facility 332 as a first class property of transactional middleware 354 as illustrated in FIG. 3, in contrast to FIG. 2, middleware based monitoring 310 does not require any data collector services 214, as external components of monitored domain 222, to extract ALTI related information from exit points and generate tracking events with ALTI formatted data based on ALTI standards. ALTI visibility 312 simplifies the installation process and maintenance process for ALTI tracking services 160 by removing the need to install any data collector services.

In the examples of FIG. 2 and FIG. 3, while each of the combination of exits and data collectors in FIG. 2 and ALTI facility 332 in FIG. 3 may generate tracking events at points throughout transaction flow 110 with ALTI data that indicates how a business transaction is performing within distributed computing environment, data collector services 214 have a high impact on CPU performance, increase the risk of application failure, and increase the complexity of installation, configuration, and maintenance of ALTI tracking services 160. In comparison, ALTI facility 332 is implemented as a first class property of transactional middleware 354 within each of domain 102, domain 104, and domain 106, and generates tracking events with ALTI data 350 with minimal impact on CPU performance, with minimal contribution to the risk of application failure, and with minimal configuration required to implement ALTI tracking services 160.

In particular, in the example in FIG. 3, ALTI visibility 312 provides an efficient method for performing ALTI tracking services 160 by reducing the CPU overhead associated with generating tracking events for multiple reasons.

First, ALTI visibility 312 reduces the CPU overhead associated with generating tracking events by managing tracking event processing at the most opportune time, rather than only when a process point for an event occurs, as triggered by the exits illustrated in FIG. 2. In one example, techniques for event processing at the most opportune time may include preprocessing, which includes creating events in anticipation before the transaction instance has started, and post processing, which includes caching ALTI related attributes as they occur and creating tracking events only after all the data is cached and ready. Thus, ALTI visibility 312 may trigger tracking events asynchronous from the transaction instance passing through process points tracked by ALTI visibility 312. In the example illustrated in FIG. 3, while points 13*a*, 14*a*, 17*a*, and 18*a* are similar to points 3*a*, 4*a*, 7*a*, and 8*a* in FIG. 2, points 13*a*, 14*a*, 17*a*, and 18*a* do not have to be at the same points in the workflow as points 13*a*, 14*a*, 17*a*, and 18*a*. In particular, while points 3*a*, 4*a*, 7*a*, and 8*a* are generic, fixed points, programmed to flow to exit points 3*c*, 4*c*, 7*c*, and 8*c* at fixed points in the workflow synchronous with the flow of the transaction instance, points 13*a*, 14*a*, 17*a*, and 18*a* may be selected by ALTI visibility 312 at the most efficient points in path code for the particular instance of transactional middleware 354, to reduce the amount of work that needs to be performed at points 13*b*, 14*b*, 17*b*, and 18*b*. ALTI visibility 312 may implement preprocessing or post processing for generating tracking events related to any of process points 13*a*, 14*a*, 17*a*, and 18*a*. Moreover, ALTI visibility 312 may select some types of process points as points within a transaction instance of a type that are required to be tracked and select other process points as points within a transaction instance of a type that are optional to be tracked, where for example, points 13*a* and 18 are types of points that are required to be tracked and points 14*a* and 17*a* are types of points that are optional to be tracked. ALTI visibility 312 may specify configurable parameters for selecting whether to track optional points.

Second, ALTI visibility 312 reduces the CPU overhead associated with generating tracking events by implementing ALTI visibility 312 as a first class property of transactional middleware 354, which means that ALTI visibility 312 is not restricted to a protected process environment of transactional middleware 354 used for restricting applications as described with reference to data collector services 214 in FIG. 2, but can access the full middleware environment of monitored domain 322. By allowing ALTI visibility 312 to access the full middleware environment of monitored domain 322, ALTI visibility 312 accesses all the ALTI related data for the full middleware environment of monitored domain 322 without requiring additional CPU overhead to move through protective barriers or interfaces that are associated with applications restricted to a protected process environment in transactional middleware 354. As previously described with reference to FIG. 2, data collector services 214, as external components of transactional middleware are restricted to an application mode or protected process environment, and for data collector services 214 to access ALTI related data, additional CPU overheard is incurred for data collector services 214 to move through protective barriers and interfaces to access ALTI related data for the full middleware environment of monitored domain 322.

Third, ALTI visibility 312 reduces the CPU overhead associated with generating tracking events by implementing ALTI visibility 312 as a first class property of transactional middleware 354, which means that ALTI visibility 312 can access the full middleware environment of monitored domain 322 and ALTI visibility 312 may employ secondary processors in the middleware space for performing transaction tracking, reducing the CPU overhead and latency associated with transaction tracking from impacting the CPUs available in the application space for the critical application path in the application space. As previously described with reference to FIG. 2, data collector services 214 are limited to transaction tracking processing in the application space, however ALTI visibility 312 moves transaction tracking processing to the middleware space, minimizing any CPU overheard associated with transaction tracking from impacting the application space.

In addition, in particular, in the example in FIG. 3, ALTI visibility 312 provides an efficient method for performing ALTI tracking services 160 by reducing the risk of causing applications to fail. ALTI visibility 312 is processed in the middleware space, rather than the application space, as described with reference to data collector services 214, and therefore any faults or errors in ALTI visibility 312 are less likely to impact the application space. In addition, in the example, ALTI visibility 312 is supported as a first class property of transactional middleware 354, in contrast to data collector services 214 which are added onto transactional middleware 254 after it is developed, or provided by a third party vendor, and therefore may be prone to faults or errors that could be detrimental to the application critical path.

In addition, in the example in FIG. 3, ALTI facility 332 outputs ALTI data 350 already formatted, and may output ALTI data 350 to systems external to monitored domain 322. In addition, in the example, ALTI visibility 312 includes ALTI management facility 334, which handles how ALTI data 350 is surfaced according to tracking telemetry standards for ALTI visibility 312, to allow for monitoring application 352 external to monitored domain 322 to access ALTI data 350. Monitoring application 352 represents on or more applications, external to monitored domain 322, which access and analyze ALTI data 350. ALTI visibility 312 is compatible with existing ALTI tracking services, monitoring applications, and other transaction tracking services.

In FIG. 3, by implementing ALTI tracking services 160 through ALTI visibility 312 implemented with transactional middleware 354, tracking is performed at the application level, where business logic is embodied, allowing for tracking data that returns metrics that when analyzed indicate how business transactions are performing within distributed environment 100. Tracking at lower levels, such as at an operating system layer or a network layer, while still of value, does not return metrics as indicative as ALTI data of how business transactions are performing within distributed environment 100.

FIG. 4 illustrates a block diagram of examples of components of ALTI visibility implemented within transactional middleware for implementing standardized ALTI tracking services across composite applications. In the example, ALTI visibility 312 includes ALTI compliant facilities 402 and tracking telemetry standards 404 for implementing standardized transaction tracking telemetry within transactional middleware 354.

In one example, ALTI compliant facilities 402 include ALTI facility 332 and ALTI management facility 334. In the example, ALTI facility 332 represents one or more functions that implement an event creation function 406 and an event correlation function 408 within transactional middleware 354, in compliance with tracking telemetry standards 404. In the example, ALTI management facility 334 represents one or more functions that implement event surfacing from transactional middleware 354, in compliance with tracking telemetry standards 404. In one example, one or more functions of ALTI facility 332 and ALTI management facility 334 are standard functions of transactional middleware 354. In another example, one or more functions of ALTI facility 332 and ALTI management facility 334 are added to transactional middleware 354, as first class properties of transactional middleware 354, in order to comply with event tracking and event surfacing requirements specified in tracking telemetry standards 404. In one example, the transactional middleware implemented in each of domain 102, domain 104, and domain 106 may implement different functions to provide ALTI compliant facilities 402, where each function is classified as an ALTI compliant facility because each function is enabled to functionally comply with tracking telemetry standards 404.

In one example, tracking telemetry standards 404 specify a set of standards for standardized transaction tracking telemetry within transaction middleware, including tracking event standards 410, tracking process standards 420, and surfacing standards 430. In the example, ALTI visibility 312 may be implemented within different types of transactional middleware with different types of components in ALTI compliant facilities 402, however, tracking telemetry standards 404 specify a standardized set of functions for implementing standardizing event tracking and event publishing by transactional middleware, across multiple types of transactional middleware. It will be appreciated by one skilled in the art that tracking telemetry standards 404 may include additional or alternate types of standards for defining one or more additional or alternate types of functions.

In the example, ALTI tracking services 160 require a well defined set of data, specified by tracking event standards 410, to be included in a tracking event generated by ALTI facility 332 as ALTI data 350. In the example, ALTI data 350 is formatted into event structures. In the example, the standards for sets of data identify required data structures for context data 412 and correlation data 414. Context data 412 includes, for example, the data describing the transaction and correlation data 414 includes, for example, the data used to correlate transaction segments. The standards for the data required for each of the data structures for context data 412 and correlation data 414 may vary depending upon the point in the transaction process path the event is generated.

In the example, transactional middleware 354 manages application level transactions of transaction based application programs and has full access to collect context data 412 from the managed transaction through ALTI facility 332. For example, standards for context data 412 may include, but is not limited to, data identifying one or more system identifiers, one or more middleware identifiers, one or more application identifiers, one or more transaction identifiers, one or more universal unique identifiers (UUID), and one or more timestamps.

In the example, for transactional middleware 324 to access correlation data 414, transactional middleware 354 must access data, unique for the transaction instance, that is available to both a client and a server for each transaction instance interaction, whether the client and server are implemented within a same transactional middleware instance in a same domain or across different transactional middleware instances in different domains. For example, correlation data 314 may include, but is not limited to, a correlation token or other unique data available to the transaction instance between the requesting domain and the requested domain.

In the example, ALTI tracking services 160 requires the creation and surfacing of tracking events with ALTI data, specified by tracking event standards 410, at strategic points in the application transaction processing path. In the example, tracking process standards 420 includes at least two types of standards for managing process point tracking and include what and when to track 422 and token and correlation management 424. In the example, what and when to track 422 defines a set of standards for event creation function 406 to implement to generate tracking events and what data to include in the tracking event. In the example, token and correlation management 424 defines a set of standards for correlation function 408 to implement to handle tokens and other correlation data depending on the protocols implemented in a particular middleware stack.

In one example, what and when to track 422 specifies that, at a minimum, tracking events should be created and surfaced for transaction instance start processes and transaction instance end processes. In addition, what and when to track 422 may specify that optionally, tracking events may be created and surfaced for asynchronous and synchronous requests to service provider domains external to the transaction instance, asynchronous and synchronous responses from service provider domains external to the transaction instance, and asynchronous and synchronous transfer of control to a spawned process external to the monitored domain. In the example, the optional events within what and when to track 422, while providing increased visibility into transactional activity, also increase the required cost of transaction tracking in terms of latency and processor overhead. While in FIG. 2, specific points are fixed, within transactional middleware, to trigger exits and tracking events are surfaced through data collectors as ALTI data 250, as illustrated in FIG. 3, through what and when to track 422 standards within ALTI visibility 312, the process points at which tracking events are triggered are adaptable to track data at the most efficient points of a transaction flow in a particular transactional middleware instance.

In the example, surfacing standards 430 define standards for at least one event surfacing function 409 to implement to surface and publish tracking events. As illustrated, surfacing standards 430 may include multiple standards including, but not limited to, availability standards 432, reliability standards 434, serviceability standards 436, high performance standards 438, self-managed standards 440, and available to multiple subscribers standards 442. Providers of transactional middleware may select from a number of different event surfacing methods and processes to implement for event surfacing function 409, where surfacing standards 430 specify the performance requirements of event surfacing function 409. It will be appreciated by one skilled in the art that surfacing standards 430 may include additional or alternate types of surfacing standards.

In the example, availability standards 432 require that event surfacing by event surfacing function 409 be enabled, disabled, and filtered using commands and services of transactional middleware 354. In the example, filtering may refer to any mechanism used by transactional middleware 354 to selectively surface visibility tracking events by event surfacing function 409. In particular, by requiring that event surfacing function 409 be filtered using command and services of transactional middleware 354, only certain events may be selectively surfaced, particularly when the rate at which events are generated exceeds a particular event generation threshold.

In the example, reliability standards 434 require that event surfacing function 409 must be independent of the application level services provided by transaction middleware 354, such that a failure in either event surfacing function 409 or in the application level services provided by transaction middleware 354 does not affect the other function or services.

In the example, serviceability standards 436 require that maintenance related to ALTI tracking services 160, including event surfacing function 409, is only required for ALTI visibility 312 of transaction middleware 354 and that there must not be any additional software components or products installed or maintained independently of transaction middleware 354 providing application level tracking services or event surfacing. For example, serviceability standards 436 restrict transaction middleware 354 from implementing ALTI exits 212 or data collector services 214 of external component monitoring 210 for application level tracking services or event surfacing, and require that all application level tracking services and event surfacing be implemented through functions that are first class properties of transactional middleware 354.

In the example, high performance standards 438 require that event surfacing must be implemented by event surfacing function 409 in the most performant manner for the targeted transaction middleware 354 and the event surfacing should be asynchronous to the application services provided by transactional middleware 354. High performance standards 438 may require that the most performant manner for event surfacing include event batching, involving creating and temporarily batching caching events before writing, in order to reduce the number of write requests.

In the example, self-managed standards 440 require that event data surfacing using event surfacing function 409 must be deleted, and potentially also archived, by transaction middleware 354. Event data volumes can grow very large in highly transactional environments. Self-managed standards 440 specify options for wrap-around files, logs, periodic deletion, or garbage collection, as solutions for event data management implemented by event surfacing function 409.

In the example, available to multiple subscribers standards 442 require that published events must be published in a manner by event surfacing function 409 to be available to multiple applications. In one example, available to multiple subscribers standards 442 may require publishing according to a write-once-read-many standard.

Figure 5:
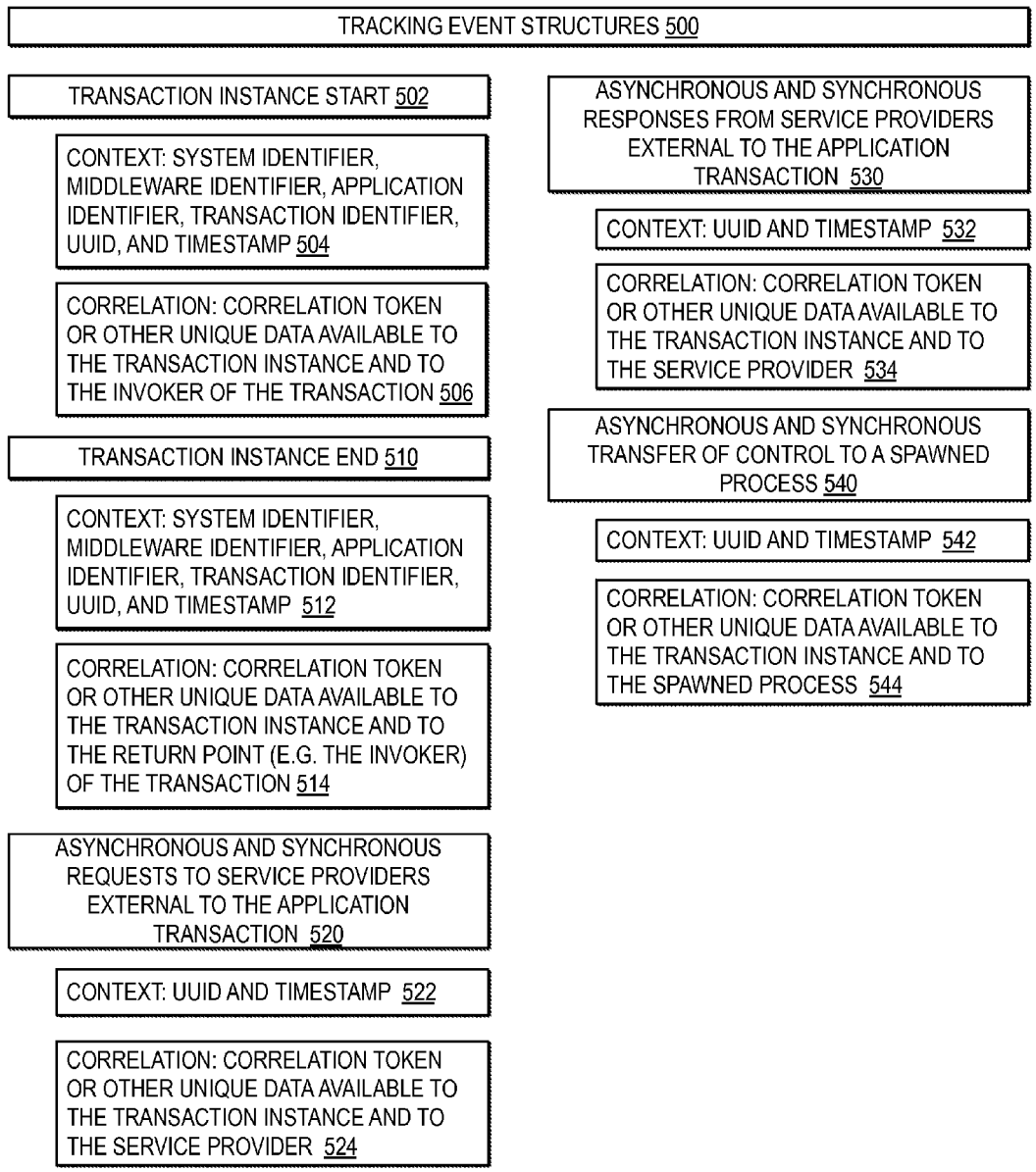
FIG. 5 illustrates a block diagram of examples of the data required for tracking event structures for ALTI data, where the ALTI data is specified according to where in the transaction process path the event is generated as defined in the visibility standards.

FIG. 5 illustrates a block diagram of examples of the data required for tracking event structures for ALTI data, where the ALTI data is specified according to where in the transaction process path the event is generated as defined in the visibility standards. In the example, tracking event structures 500 includes multiple examples of the context data and correlation data specified in a tracking event structure according to where in the transaction process path the event is generated.

In the example, a first event structure, illustrated at reference numeral 502, is generated for a transaction instance start on the transaction process path, such as point 13a in FIG. 3. In the example, for the event structure generated for a transaction instance start, context data 504 includes a system identifier, middleware identifier, application identifier, transaction identifier, UUID, and timestamp and correlation data 506 includes a correlation token or other unique data available to the transaction instance and to the invoker of the transaction.

In the example, a second event structure, illustrated at reference numeral 510, is generated for a transaction instance end on the transaction process path, such as process point 18a in FIG. 3. In the example, for the event structure generated for a transaction instance end, context data 512 includes a system identifier, middleware identifier, application identifier, transaction identifier, UUID, and timestamp and correlation data 514 includes a correlation token or other unique data available to the transaction instance and to the return point (e.g. the invoker) of the transaction.

In the example, a third event structure, illustrated at reference numeral 520, is generated for asynchronous and synchronous requests to service providers external to the application transaction on the transaction process path, such as process point 14a in FIG. 3. In the example, for the event structure generated for asynchronous and synchronous requests to service providers external to the application transaction, context data 522 includes a UUID and timestamp and correlation data 524 includes a correlation token or other unique data available to the transaction instance and to the service provider.

In the example, a fourth event structure, illustrated at reference numeral 530, is generated for asynchronous and synchronous responses from service providers external to the application transaction on the transaction process path, such as process point 17a in FIG. 3. In the example, for the event structure generated for asynchronous and synchronous responses from service providers external to the application transaction, context data 532 includes a UUID and timestamp and correlation data 534 includes a correlation token or other unique data available to the transaction instance and to the service provider.

In the example, a fifth event structure, illustrated at reference numeral 540, is generated for asynchronous and synchronous transfer of control to a spawned process on the transaction process path. In the example, for the event structure generated for asynchronous and synchronous transfer of control to a spawned process, context data 542 includes a UUID and timestamp and correlation data 544 includes a correlation token or other unique data available to the transaction instance and to the spawned process.

Figure 6:
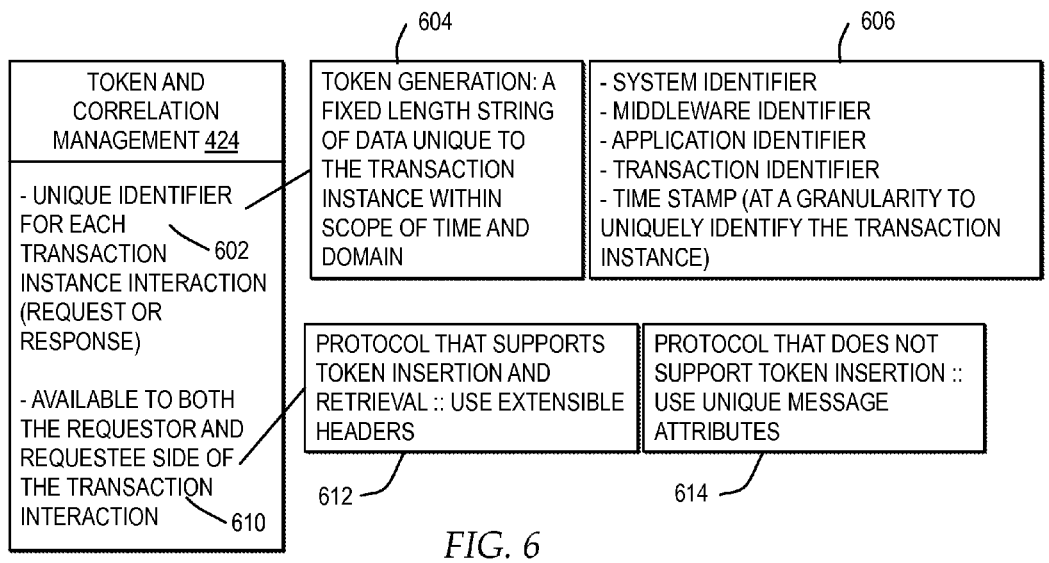
FIG. 6 illustrates a block diagram of the standard and implementation for token and correlation management for ALTI tracking services implemented within transactional middleware through ALTI visibility.

FIG. 6 illustrates a block diagram of the standard and implementation for token and correlation management for ALTI tracking services implemented within transactional middleware through ALTI visibility. In the example, correlation function 408 manages generation of correlation data, in the form of tokens, and passing correlation data about the requesting domain and the requested domain, for a transaction flow. The structures and protocols in which correlation function 408 passes and manages correlation data may vary between transactional middleware. Token and correlation management 424 specifies, for ALTI visibility 312, standards for correlation data passing and management to accommodate for the differences in structures and protocols implemented by correlation function 408 across different transactional middleware. In particular, passing correlation data through tokens between domains is complex and protocol dependent, therefore token and correlation management 424 must ensure that transactional middleware accept, create, and pass tokens, in some form.

In the example, token and correlation management 424 includes a first rule 602 that the correlation data managed by correlation function 408 include a unique identifier for each transaction instance interaction, whether a request or a response. In one example, correlation function 408 generates a token data structure for each transaction instance interaction, and inserts the correlation data in the token. In the example, first rule 502 is further specified by a token generation rule 604 for specifying that a token be generated with correlation data of a fixed length string of data unique to the transaction instance within the scope of the time and the domain of the transaction. In one example, as illustrated at reference numeral 606, the fixed length string of correlation data generated in a token may include a fixed length strength of data including, but not limited to, a system identifier, a middleware identifier, an application identifier, a transaction identifier, and a time stamp, at a granularity to uniquely identify the transaction instance.

In the example, token and correlation management 424 includes a second rule 610 that the correlation data managed by correlation function 408 be available to both the requestor and the requestee side of the transaction interaction. For example, second rule 610 requires that the correlation data managed by correlation function 408 be available to a requesting domain and a receiving domain. In the example, second rule 610 is further specified depending on whether correlation function 408 of the managing domain implements a protocol that supports token insertion and retrieval. In general, tokens are expected in inbound requests from upstream processes and when located, are to be extracted and passed to all down stream requests, however, if a token is not available from an inbound request, a new token is generated and passed down to all subsequent downstream processes.

In the example, if correlation function 408 of the managing domain implements a protocol that supports token insertion and retrieval, the standard specified at reference numeral 612 directs correlation function 408 to use extensible headers in the protocol for correlation data token insertion and retrieval. In one example, a protocol such as Simple Object Access Protocol (SOAP) full supports token insertion and retrieval using extensible headers.

In the example, if correlation function 408 of the managing domain does not implement a protocol that supports token insertion, the standard specified at reference numeral 614 directs correlation function 408 to use unique message attributes in the protocol for correlation data insertion and retrieval. In one example, a protocol such as Websphere MQ does not support token insertions, however, for Websphere MQ, unique attributes associated with each Websphere MQ message are available to both the requestor and receiver of the message, enabling data associated with the unique message attributes to be used as a token.

In the example, tokens must be common between each instance of a client and server interaction and each token must be unique across the monitored environment. In one example, the uniqueness property is specified as perpetual, however, in practice, the uniqueness property needs to hold for a monitoring period.

Figure 7:
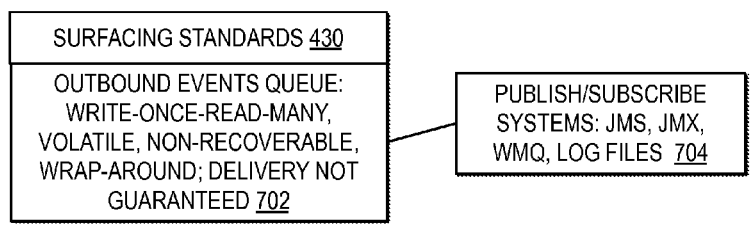
FIG. 7 illustrates one example of a block diagram of the standard and implementation for event surfacing for ALTI tracking services implemented within transactional middleware through ALTI visibility.

FIG. 7 illustrates one example of a block diagram of the standard and implementation for event surfacing for ALTI tracking services implemented within transactional middleware through ALTI visibility. In the example, surfacing standards 430 include multiple attributes 702 of event surfacing function 409 including but not limited to "write-once-read-many", volatile, non-recoverable, wrap-around, and delivery not guaranteed. In the example, surfacing formats 704 that comply with attributes 702 for publish and subscribe interface include, but are not limited to, Java Messaging Service (JMS), Java Management Extensions (JMX), Websphere® MQ (WMQ), and log files.

Figure 8:
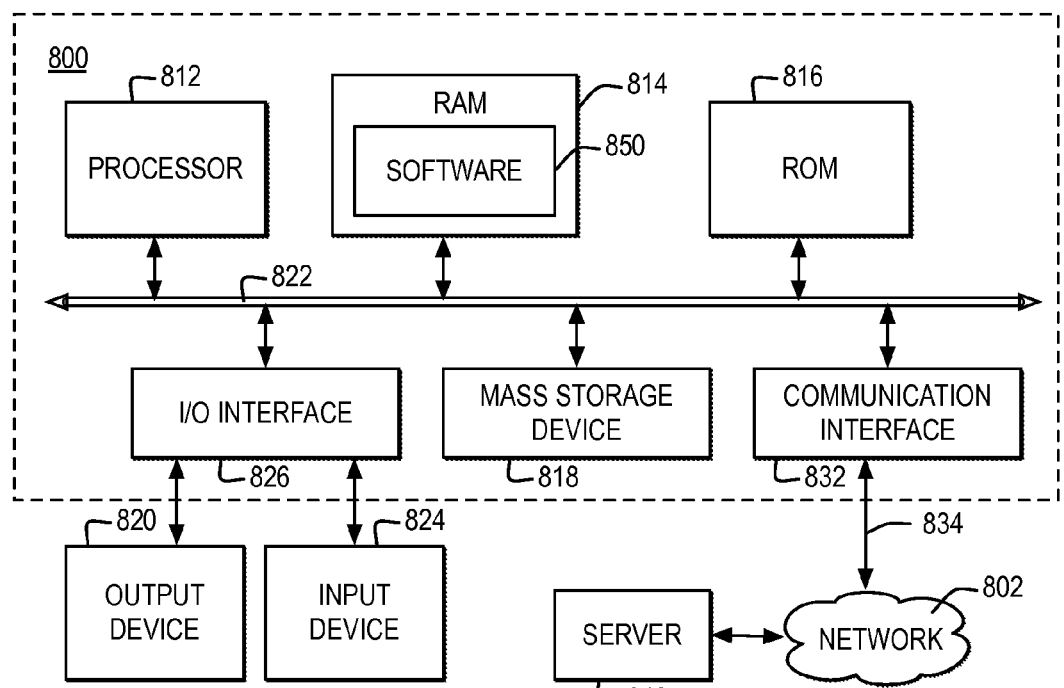
FIG. 8 illustrates one example of a computer system in which one embodiment of the invention may be implemented.

FIG. 8 illustrates one example of a computer system in which one embodiment of the invention may be implemented.

The present invention may be performed in a variety of systems and combinations of systems, made up of functional components, such as the functional components described with reference to computer system 500 and may be communicatively connected to a network, such as network 502.

Computer system 800 includes a bus 822 or other communication device for communicating information within computer system 800, and at least one hardware processing device, such as processor 812, coupled to bus 822 for processing information. Bus 822 preferably includes low-latency and higher latency paths that are connected by bridges and adapters and controlled within computer system 800 by multiple bus controllers. When implemented as a server or node, computer system 800 may include multiple processors designed to improve network servicing power. Where multiple processors share bus 822, additional controllers (not depicted) for managing bus access and locks may be implemented.

Processor 812 may be at least one general-purpose processor such as IBM® PowerPC® processor that, during normal operation, processes data under the control of software 850, which may include at least one of application software, an operating system, middleware, and other code and computer executable programs accessible from a dynamic storage device such as random access memory (RAM) 814, a static storage device such as Read Only Memory (ROM) 816, a data storage device, such as mass storage device 818, or other data storage medium. Software 850 may include, but is not limited to, code, applications, protocols, interfaces, and processes for controlling one or more systems within a network including, but not limited to, an adapter, a switch, a server, a cluster system, and a grid environment.

Figure 9:
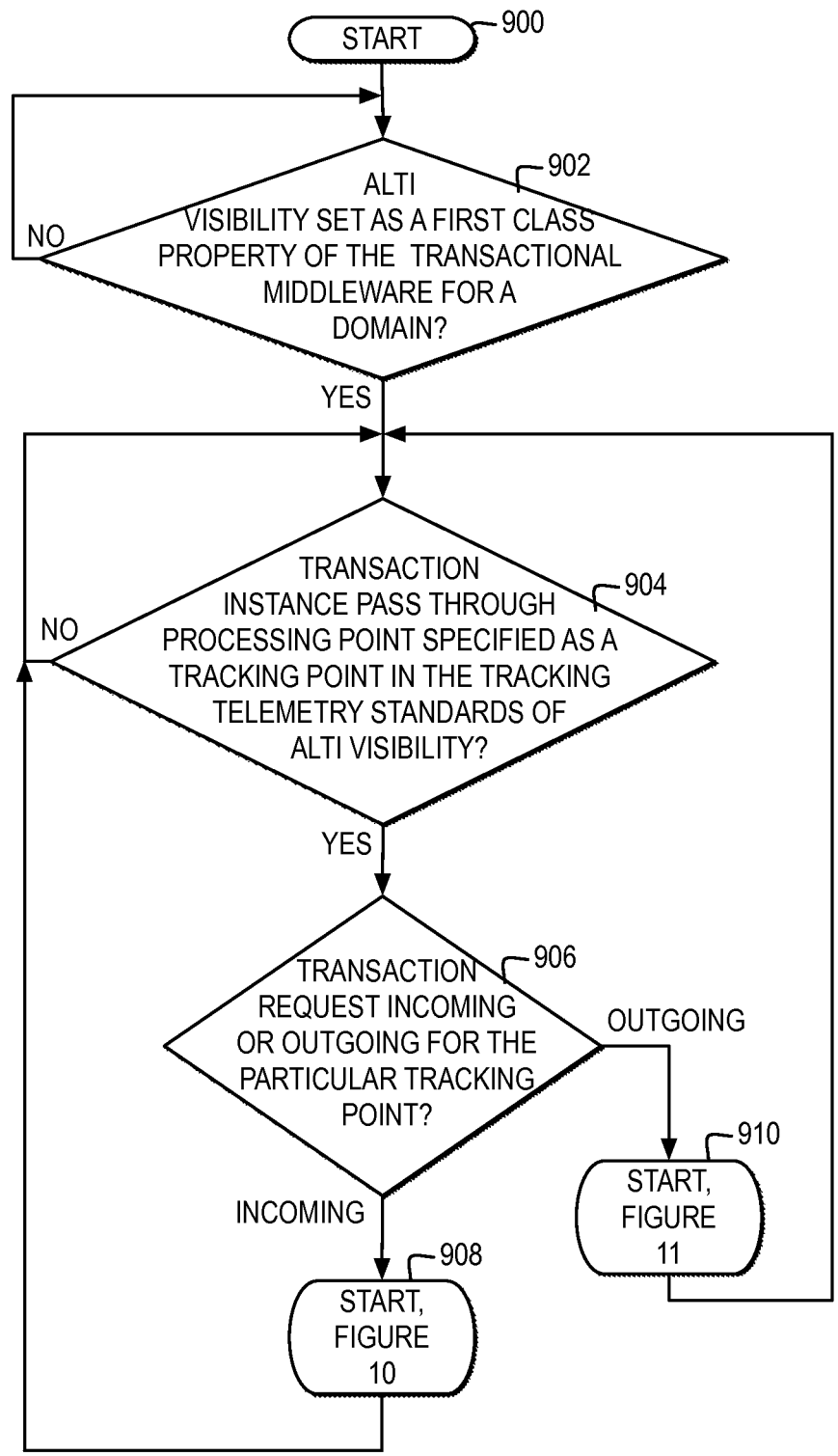
FIG. 9 illustrates a high level logic flowchart of a process and program for implementing ALTI tracking services for tracking a transaction flow across a composite application through ALTI visibility implemented in the transactional middleware of the composite application.
Figure 10:
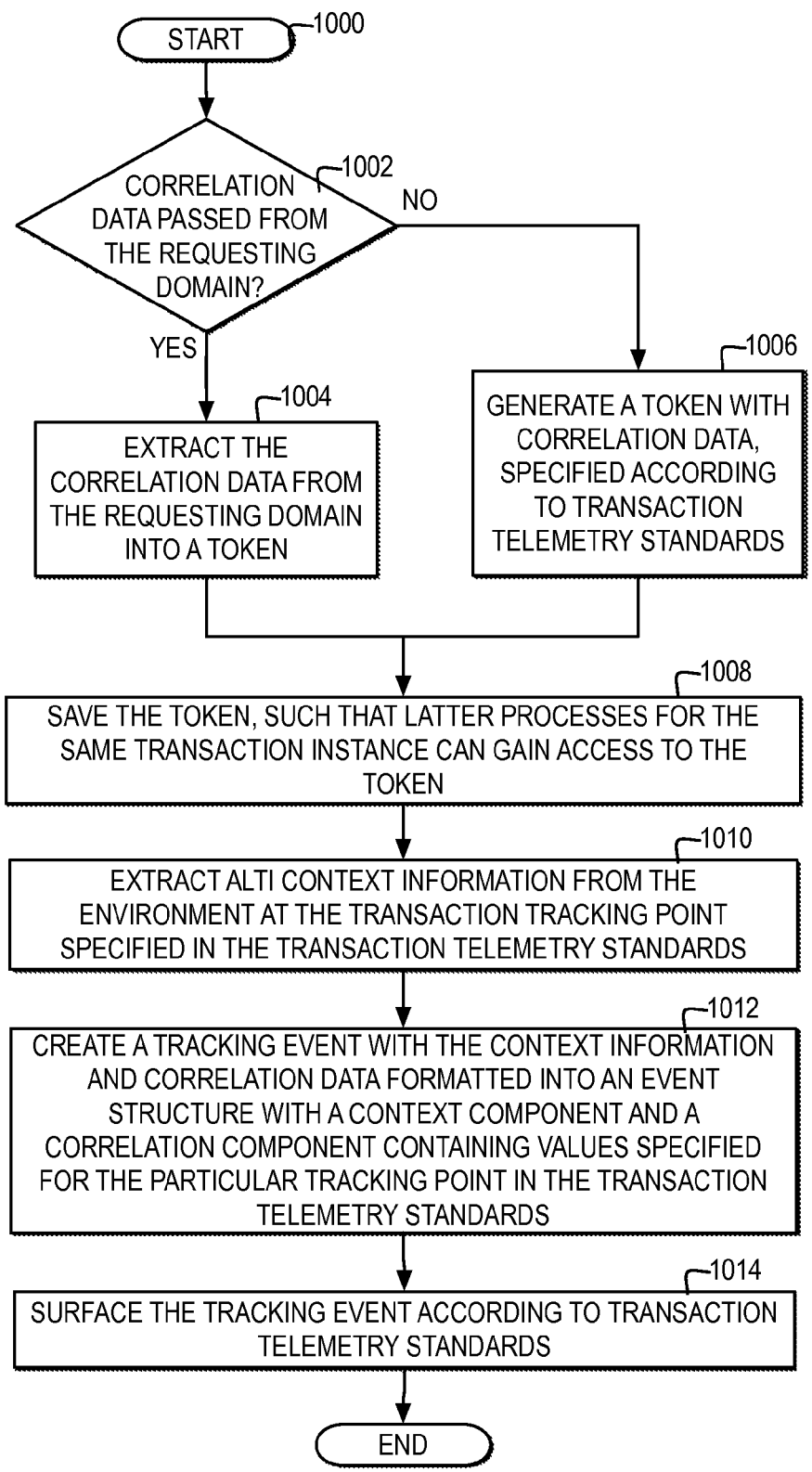
FIG. 10 illustrates a high level logic flowchart of a process and program for generating and surfacing tracking events by transaction middleware for incoming transaction requests at a tracking point.
Figure 11:
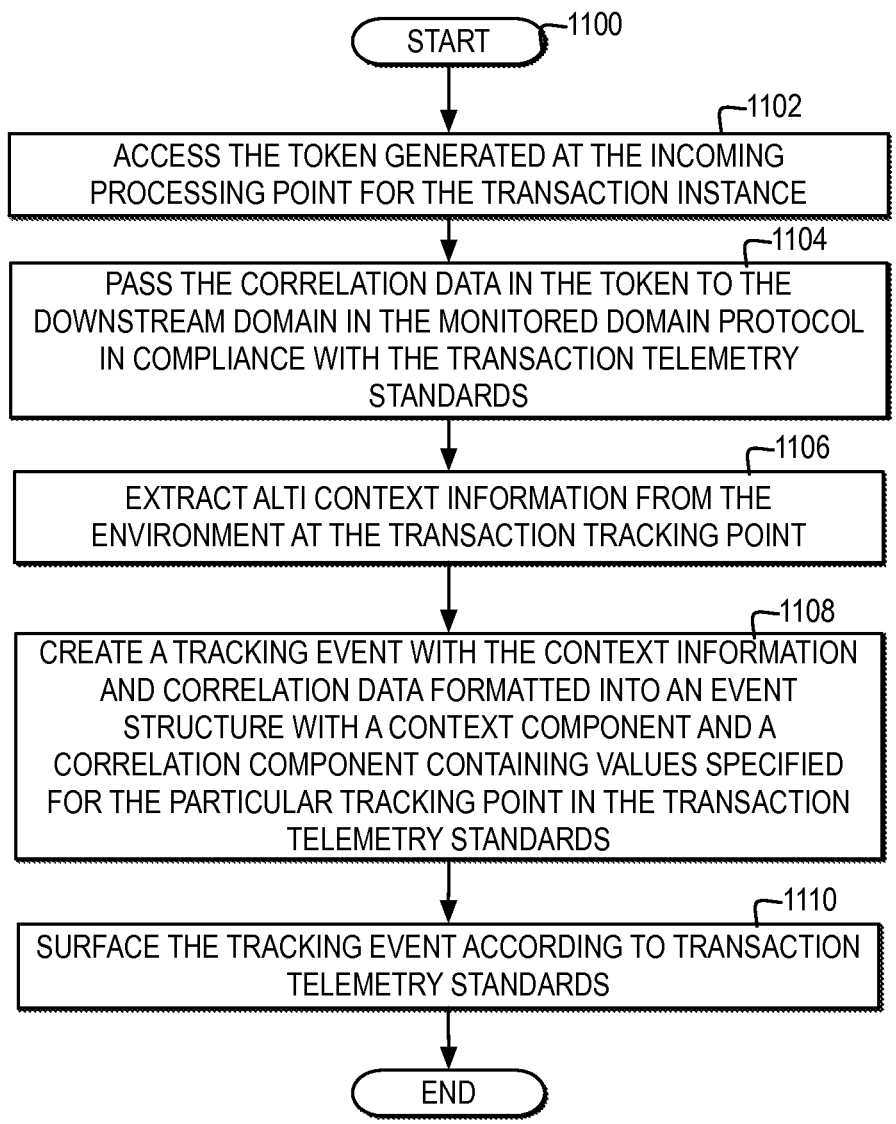
FIG. 11 illustrates a high level logic flowchart of a process and program for generating and surfacing tracking events by transaction middleware for outgoing transaction requests at a tracking point.

In one embodiment, the operations performed by processor 812 may control the operations of flowchart of FIGS. 9-11 and other operations described herein. Operations performed by processor 812 may be requested by software 850 or other code or the steps of one embodiment of the invention might be performed by specific hardware components that contain hardwired logic for performing the steps, or by any combination of programmed computer components and custom hardware components.

Those of ordinary skill in the art will appreciate that aspects of one embodiment of the invention may be embodied as a system, method or computer program product. Accordingly, aspects of one embodiment of the invention may take the form of an entirely hardware embodiment, an entirely software embodiment (including firmware, resident software, microcode, etc.) or an embodiment containing software and hardware aspects that may all generally be referred to herein as "circuit," "module," or "system." Furthermore, aspects of one embodiment of the invention may take the form of a computer program product embodied in one or more tangible computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, such as mass storage device 818, a random access memory (RAM), such as RAM 814, a read-only memory (ROM) 816, an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction executing system, apparatus, or device.

A computer readable signal medium may include a propagated data signal with the computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction executable system, apparatus, or device.

Program code embodied on a computer readable medium may be transmitted using any appropriate medium, including but not limited to, wireless, wireline, optical fiber cable, radio frequency (RF), etc., or any suitable combination of the foregoing.

Computer program code for carrying out operations of on embodiment of the invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, such as computer system 800, partly on the user's computer, as a stand-alone software package, partly on the user's computer and partly on a remote computer or entirely on the remote computer or server, such as server 840. In the latter scenario, the remote computer may be connected to the user's computer through any type of network, such as network 802, through a communication interface, such as network interface 832, over a network link that may be connected, for example, to network 502.

In the example, network interface 832 includes an adapter 834 for connecting computer system 800 to network 802 through a link and for communicatively connecting computer system 800 to server 840 or other computing systems via network 802. Although not depicted, network interface 832 may include additional software, such as device drivers, additional hardware and other controllers that enable communication. When implemented as a server, computer system 500 may include multiple communication interfaces accessible via multiple peripheral component interconnect (PCI) bus bridges connected to an input/output controller, for example. In this manner, computer system 800 allows connections to multiple clients via multiple separate ports and each port may also support multiple connections to multiple clients.

One embodiment of the invention is described below with reference to flowchart illustrations and/or block diagrams of methods, apparatus (systems) and computer program products according to embodiments of the invention. Those of ordinary skill in the art will appreciate that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, such as computer system 800, or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, such as computer system 800, or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Network interface 832, the network link to network 802, and network 802 may use electrical, electromagnetic, or optical signals that carry digital data streams. The signals through the various networks and the signals on network 802, the network link to network 802, and network interface 832 which carry the digital data to and from computer system 800, may be forms of carrier waves transporting the information.

In addition, computer system 800 may include multiple peripheral components that facilitate input and output. These peripheral components are connected to multiple controllers, adapters, and expansion slots, such as input/output (I/O) interface 826, coupled to one of the multiple levels of bus 822. For example, input device 824 may include, for example, a microphone, a video capture device, an image scanning system, a keyboard, a mouse, or other input peripheral device, communicatively enabled on bus 822 via I/O interface 826 controlling inputs. In addition, for example, output device 820 communicatively enabled on bus 822 via I/O interface 826 for controlling outputs may include, for example, one or more graphical display devices, audio speakers, and tactile detectable output interfaces, but may also include other output interfaces. In alternate embodiments of the present invention, additional or alternate input and output peripheral components may be added.

Those of ordinary skill in the art will appreciate that the hardware depicted in FIG. 8 may vary. Furthermore, those of ordinary skill in the art will appreciate that the depicted example is not meant to imply architectural limitations with respect to the present invention.

FIG. 9 illustrates a high level logic flowchart of a process and program for implementing ALTI tracking services for tracking a transaction flow across a composite application through ALTI visibility implemented in the transactional middleware of the composite application. In the example, the process starts at block 900 and thereafter proceeds to block 902. Block 902 illustrates a determination whether ALTI visibility is set as a first class property of the transactional middleware for a domain. If ALTI visibility is set as a first class property of the transactional middleware for a domain, then the process passes to block 904. Block 904 illustrates a determination whether a transaction instance has passed through a processing point specified as a tracking point in the tracking telemetry standards of ALTI visibility. When a transaction instance has passed through a processing point specified as a tracking point in the tracking telemetry standards of ALTI visibility, then the process passes to block 906. Block 906 illustrates a determination whether a transaction request is incoming to the monitored domain or outgoing from the monitored domain for the particular tracking point. At block 906, if a transaction request is incoming to the monitored domain, then the process passes to block 908. At block 906, if a transaction request is outgoing from the monitored domain, then the process passes to block 910.

FIG. 10 illustrates a high level logic flowchart of a process and program for generating and surfacing tracking events by transaction middleware for incoming transaction requests at a tracking point. In the example, the process starts at block 1000 and thereafter proceeds to block 1002, illustrating steps performed by transactional middleware through ALTI visibility.

Block 1002 illustrates a determination whether correlation data is passed from the requesting domain. At block 1002, if there is correlation data passed from the requesting domain, then the process passes to block 1004. Block 1004 illustrates extracting the correlation data from the requesting domain into a token, and the process passes to block 1008. Returning to block 1002, if there is not correlation data passed from the requesting domain, and the process passes to block 1006. Block 1006 illustrates generating a token with correlation data, specified according to transaction telemetry standards, and the process passes to block 1008.

Block 1008 illustrates saving the token, such that latter processes for the same transaction instance can gain access to the token. Next, block 1010 illustrates extracting ALTI context information from the environment at the transaction tracking point specified in the transaction telemetry standards. Thereafter, block 1012 illustrates creating a tracking event with the context information and correlation data formatted into an event structure with a context component and a correlation component containing values specified for the particular tracking point in the transaction telemetry standards. Next, block 1014 illustrates surfacing the tracking event according to transaction telemetry standards, and the process ends.

FIG. 11 illustrates a high level logic flowchart of a process and program for generating and surfacing tracking events by transaction middleware for outgoing transaction requests at a tracking point. In the example, the process starts at block 1100 and thereafter proceeds to block 1102. Block 1102 illustrates accessing the token generated at the incoming processing point for the transaction instance. Next, block 1104 illustrates passing the correlation data in the token to the downstream domain in the monitored domain protocol in compliance with the transaction telemetry standards. Thereafter, block 1106 illustrates extracting ALTI context information from the environment at the transaction tracking point. Next, block 1108 illustrates creating a tracking event with the context information and correlation data formatted into an event structure with a context component and a correlation component containing values specified for the particular tracking point in the transaction telemetry standards. Thereafter, block 1110 illustrates surfacing the tracking event according to transaction telemetry standards, and the process ends.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification specify the presence of stated features, integers, steps, operations, elements, and/or components, but not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the one or more embodiments of the invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

While the invention has been particularly shown and described with reference to one or more embodiments, it will be understood by those skilled in the art that various changes in form and detail may be made therein without departing from the spirit and scope of the invention.

What is claimed is:

1. A method for tracking a transaction flow in a distributed environment comprising at least one computer system, comprising:

responsive to transactional middleware for a particular domain processing a particular transaction instance at a particular processing point specified in transaction telemetry standards as a tracking point along a flow of the particular transaction, accessing, by at least one facility of the transactional middleware, correlation data for the particular transaction instance in the particular domain and extracting, by the at least one facility, application level context information about the particular transaction instance from the particular domain, wherein the transaction telemetry standards specify a same set of standards for application by each separate transactional middleware instance of a plurality of middleware instances of a composite application through each of the different types of facilities of each separate middleware instance;

creating, by the at least one facility of the transactional middleware, a tracking event comprising the correlation data and the application level context information formatted into an event structure defined by the transaction tracking standards for a type of processing point of the tracking point; and surfacing the tracking event, by the at least one facility of the transactional middleware in compliance with the transaction telemetry standards, for access to the tracking event by applications external to the particular domain.

2. The method according to claim 1, further comprising:

determining whether an incoming request to the particular domain for the particular transaction instance is made at the tracking point;

responsive to the tracking point occurring for the incoming request, determining whether a requester sending the incoming request has passed a token with the correlation data to the particular domain in the protocol implemented by the requester in compliance with the transaction telemetry standards;

responsive to detecting the token with the correlation data passed to the particular domain, extracting the correlation data from the token;

responsive to not detecting the token with the correlation data passed to the particular domain, generating a new token with generated correlation data accessible to the particular domain comprising a unique identifier for the particular transaction instance accessible to each of the requester and the particular domain; and saving the token for access by at least one other process of the particular transactional middleware for the particular transaction instance.

3. The method according to claim 1, further comprising:

determining whether an outgoing request from the particular domain is made by the particular transaction instance at the tracking point;

responsive to the tracking point occurring at the outgoing request from the particular domain, accessing a token comprising the correlation data stored by the middleware stack; and passing the token to a downstream domain receiving the outgoing request.

4. The method according to claim 1, further comprising:

detecting, in the transaction telemetry standards, a requirement to create and surfacing the tracking event when the type of processing point is a start of the particular transaction instance in the flow by an invoker of the transaction instance; and responsive to determining the type of processing point of the tracking point is the start of the particular transaction instance in the flow, creating, by the at least one facility of the transactional middleware, the tracking event comprising the correlation data comprising unique data available to the particular transaction instance and to the invoker of the transaction instance and the application level context comprising a system identifier, a middleware identifier, an application identifier, a transaction identifier, a unique universal identifier, and a timestamp.

5. The method according to claim 1, further comprising:

detecting, in the transaction telemetry standards, a requirement to create and surfacing the tracking event when the type of processing point is an end of the particular transaction instance in the flow returning a result to the invoker of the particular transaction instance; and responsive to determining the type of processing point of the tracking point is the end of the particular transaction instance in the flow, creating, by the at least one facility of the transactional middleware, the tracking event comprising the correlation data comprising unique data available to the particular transaction instance at the particular domain and to the invoker of the transaction instance and the application level context comprising a system identifier, a middleware identifier, an application identifier, a transaction identifier, a unique universal identifier, and a timestamp.

6. The method according to claim 1, further comprising:

detecting, in the transaction telemetry standards, a requirement to create and surfacing the tracking event when the type of processing point is at least one of an asynchronous and a synchronous request by the particular transaction instance in the flow to a downstream domain external to the particular domain; and responsive to determining the type of processing point of the tracking point is the at least one of the asynchronous and the synchronous request by the particular transaction instance in the flow to a downstream domain external to the particular domain, creating, by the at least one facility of the transactional middleware, the tracking event comprising the correlation data comprising unique data available to the particular transaction instance at the particular domain and to the downstream domain and the application level context comprising a unique universal identifier, and a timestamp.

7. The method according to claim 1, further comprising:

detecting, in the transaction telemetry standards, a requirement to create and surfacing the tracking event when the type of processing point is at least one of an asynchronous and a synchronous response by a downstream domain external to the particular domain; and responsive to determining the type of processing point of the tracking point is the at least one of the asynchronous and the synchronous response by a downstream domain external to the particular domain, creating, by the at least one facility of the transactional middleware, the tracking event comprising the correlation data comprising unique data available to the particular transaction instance at the particular domain and to the downstream domain and the application level context comprising a unique universal identifier, and a timestamp.

8. The method according to claim 1, further comprising:

detecting, in the transaction telemetry standards, a requirement that the particular transaction middleware comprise the at least one facility for performing tracking event surfacing, that the at least one facility selectively surface the tracking event and surface the tracking event asynchronous to other events surfaced by any other application level services of the particular transactional middleware, that the at least one facility operate independent of the any other application level services, that the at least one facility delete the surfaced tracking event, and that the at least one facility surface the tracking event to a write once ready many interface.

9. The method according to claim 1, further comprising:

requiring, by the transaction tracking standards, that the at least one facility be operable to comply with the at least one transaction tracking standards and that the at least one facility be a first class property of the particular transactional middleware.

10. The method according to claim 1, further comprising:

specifying, by the transaction tracking standards, the particular transactional middleware as at least one process in a distributed computing environment that runs above an operating system layer and supports transact based application programs.

* * * * *